Oct. 20, 1959 G. P. WENNEMER 2,909,606

NOISE COMPENSATED TONE SIGNALING SYSTEM

Filed Oct. 22, 1957 2 Sheets-Sheet 1

INVENTOR
G. P. WENNEMER
BY B. [signature] Stoddard.
ATTORNEY

Oct. 20, 1959 G. P. WENNEMER 2,909,606

NOISE COMPENSATED TONE SIGNALING SYSTEM

Filed Oct. 22, 1957 2 Sheets-Sheet 2

INVENTOR
G. P. WENNEMER
BY B. F. Stoddard
ATTORNEY

United States Patent Office 2,909,606

Patented Oct. 20, 1959

2,909,606

NOISE COMPENSATED TONE SIGNALING SYSTEM

Gerard P. Wennemer, Fairmount, N.J., assignor to Bell Telephone Laboratories, Incorporated, New York, N.Y., a corporation of New York Application October 22, 1957, Serial No. 691,693

6 Claims. (Cl. 178—88)

This invention relates to tone signaling systems and, more particularly, to tone signal receiving systems employing tone signals for performing various functions.

In tone signaling systems, one method of transmitting signals utilizes modulation of carrier wave energy with a first low frequency tone for one type of signal and a second low frequency tone for another type of signal. When these signals are received at a receiving station, they are frequently accompanied by noise currents originating outside the system from such external sources as static or inductive interference. The signals may also encounter other noise currents produced within the receiver from various internal sources, such as in the radio frequency amplifier or converter stages. Both types of noise currents are characterized by having random fluctuations of both frequency and amplitude. These noise currents may impair the operation of a signal receiver either by phasing out the signals or by falsely simulating signals.

Accordingly, it is an object of this invention to increase the reliability of signal reception in a tone signal receiving system.

It is also an object of the invention to provide a tone signal receiving system with a guard circuit for minimizing false operation of the receiver by noise currents.

These and other objects of the invention are accomplished by providing each tone selective circuit in a tone signal receiving system with a tone-actuated relay for differentially controlling the operation of a selector relay. Each of the tone-actuated relays is supplied with a holding circuit connected to a respective different contact of the selector relay. The armature of the selector relay is connected to a circuit extending to ground under the control of the armature of a noise-actuated relay. Thus, when noise is present, the noise-actuated relay will connect ground to the holding circuit of that particular tone-actuated relay which has at that moment operated the selector relay. This serves to hold the armature of an associated signal utilization relay in the position to which it was last operated as is explained more fully hereinafter.

These and other features of the invention are more fully discussed in connection with the following detailed description of the drawing in which.

Figure 1:
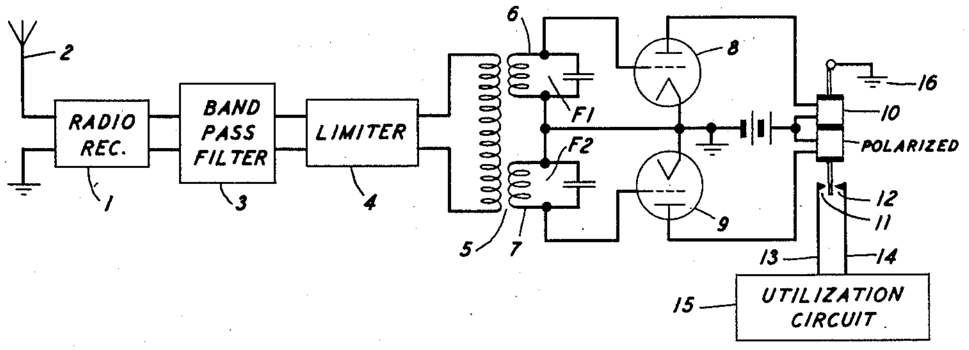
Fig. 1 is a simplified circuit diagram of a tone signaling radio receiving system which is presented for explanatory purposes.

In Fig. 1, a radio receiving system is shown to include a radio receiver 1 which is provided with an antenna 2 for receiving carrier waves modulated alternatively with either a first low frequency tone F1 or a second low frequency tone F2. The receiver 1 may be of any suitable type having amplifying means for increasing the strength of the received signals and also having demodulating means for removing the carrier component. The output from the receiver 1 is supplied to a bandpass filter 3 which is so designed as to pass both the first and second tones but not noise or other currents having frequencies outside this range. The energy from the filter 3 is delivered to a suitable limiter 4 which produces output energy of substantially constant level thereby compensating to some extent for level fluctuation caused by fading.

The output from the limiter 4 is applied to the primary winding of a transformer 5. The secondary side of transformer 5 includes two tuned circuits 6 and 7 coupled respectively to thermionic detectors 8 and 9 which may be considered as constituting electroresponsive devices or means. The circuit 6 is tuned to the first signal tone and passes energy having the first tone frequency F1 to the control grid of the detector 8. Similarly, the circuit 7 is tuned to the second modulating tone and supplies energy having the second tone frequency F2 to the grid of the detector 9. The plate circuits of the electroresponsive detectors 8 and 9 extend respectively through upper and lower windings of a polarized relay 10 for controlling the alternative engagement of its armature with its associated contacts 11 and 12 which are connected by leads 13 and 14, respectively, to a suitable utilization circuit 15.

Thus, when carrier waves modulated with the first tone F1 are received by the antenna 2, the resulting demodulated tone energy passes through the tuned circuit 6 to the detector 8 thereby causing the polarized relay 10 to move its armature into engagement with its left contact 11. This connects ground 16 over the armature and contact 11 of relay 10 to the lead 13 extending to the utilization circuit 15. When carrier waves modulated with the second tone F2 are applied to the radio receiver 1, the demodulated tone energy passes through the tuned circuit 7 to the detector 9 and the resulting rectified energy causes the electroresponsive device constituted by the relay 10 to operate its armature into engagement with its right contact 12. Accordingly, the ground 16 will now be connected to the lead 14 extending from the utilization circuit 15. The utilization circuit 15 may be of any suitable type desired for meeting the requirements of a particular system. For example, if the tone signals received by the radio receiver 1 are connect and disconnect signals, then the utilization circuit 15 could be constituted by switching equipment having its operation controlled by the movements of the armature of relay 10, which may be regarded as constituting a signaling instrumentality.

It is to be understood that the receiving system shown in Fig. 1 is presented for explanatory purposes and that this invention is not limited to a system employing radio transmission of signals but is applicable to other types of systems, such as carrier systems utilizing wire lines for the transmission of signals. When this invention is applied to a wire line carrier system, the tone signals could be transmitted from a subscriber's station to a central office where they could be used for supervisory signaling purposes by having the first tone F1 function as a disconnect signal and the second tone F2 serve as a connect signal. In this event, the equipment shown in Fig. 1 would be located at a central office and a suitable receiving line amplifier would be substituted for the antenna 2 and the radio receiver 1. The utilization circuit 15 would now be constituted by a supervisory signal receiving circuit so designed that, when a disconnect tone signal F1 passes through the tuned circuit 6 and effects the movement of the armature of relay 10 to its left contact 11, the circuit 15 will place its associated switching equipment in the disconnect condition. Similarly, when a connect tone signal F2 passes through the tuned circuit 7, the resulting movement of the armature of relay 10 into engagement with its right contact 12 will cause the supervisory circuit 15 to place the switching equipment in its connect condition.

In order to explain the effect of noise currents upon the operation of the system represented in Fig. 1, let it be assumed that the system is receiving tone energy of the frequency F1 and that the armature of relay 10 is in engagement with its left contact 11. Now, if noise currents should appear, some of the noise energy might be of the same frequency as the signal tone F1 but of opposite phase so that it would add out of phase with the signal tone F1 thereby in effect canceling it. At the same time, some of the noise energy might be of the same frequency as the other signal tone F2 thereby producing a simulated signal tone F2 which would cause incorrect operation of the utilization circuit 15. For example, if the system should be receiving a disconnect signal in the form of tone F1 as was described above, it can be understood that it would be objectionable if this signal should be canceled by noise currents. If, at the same time, the noise currents should simulate tone F2, then a false connect signal would be registered in the supervisory circuit 15.

Figure 2:
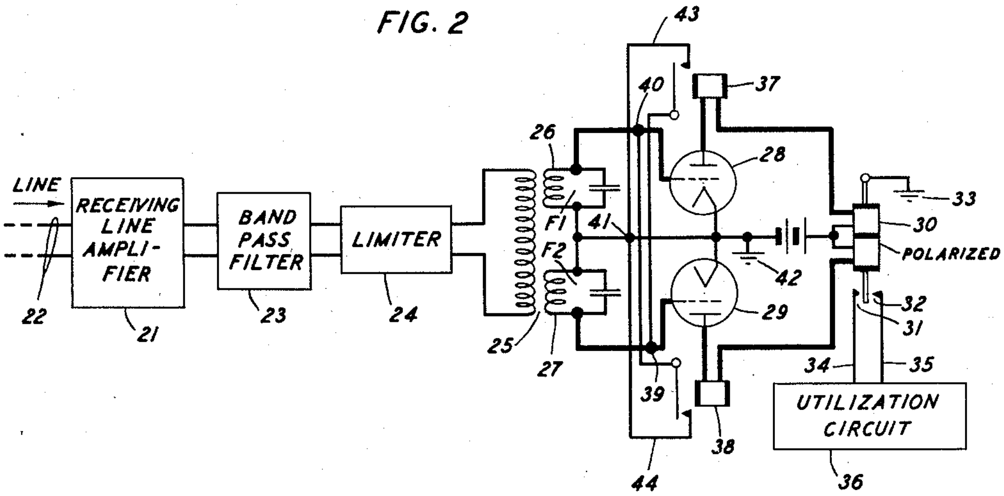
Fig. 2 shows a wire line carrier receiving system having noise suppression means controlled by signal-actuated means for reducing the occurrence of errors.

Accordingly, in order to prevent the simulation of a tone signal by noise currents, the system shown in Fig. 2 is provided with a signal-actuated means for controlling the operation of noise suppression means. In Fig. 2, a wire line carrier receiving system is represented as having a receiving line amplifier 21 coupled to a wire transmission line 22 for receiving two-tone carrier telegraph signals. The amplified signal output from the amplifier 21 is delivered through a bandpass filter 23 and limiter 24 to the primary winding of a transformer 25. The secondary side of the transformer 25 is like that of the transformer 5 in Fig. 1 in that it includes two tuned circuits 26 and 27 which are tuned respectively to the two signal tone frequencies F1 and F2. The tuned circuits 26 and 27 are coupled respectively to the control grids of electroresponsive detectors 28 and 29 which have their plate circuits coupled to the upper and lower windings respectively of an electroresponsive device constituted by a polarized relay 30. The armature of relay 30, like the armature of relay 10, is adapted to engage its contacts 31 and 32 alternatively for applying ground 33 to either of the leads 34 and 35 extending to a utilization circuit 36, which may, for example, be suitable switching equipment. In this case, the polarized relay 30 may be regarded as constituting a signaling instrumentality. Up to this point of the description, it can be understood that the equipment in the system of Fig. 2 is basically the same as that of Fig. 1.

However, it should be noted that the winding of an electroresponsive guard relay 37 is connected in the path extending from the plate of the detector 28 to the upper winding of relay 30, and that the winding of a similar electroresponsive guard relay 38 is connected in the path extending from the plate of the detector 29 to the lower winding of relay 30. The armature of the guard relay 37 is connected to a junction point 39 in the path extending from the tuned circuit 27 to the grid of the detector 29. Similarly, the armature of the guard relay 38 is connected to a junction point 40 in the path from the tuned circuit 26 to the grid of the detector 28. As can be seen in Fig. 2, a junction point 41 is connected over an obvious path to a ground 42 associated with the cathodes of the detectors 28 and 29. One side of this grounded junction point 41 is connected by a lead 43 to the contact of the first guard relay 37 and the other side is connected by a lead 44 to the contact of the second guard relay 38.

Thus, when a tone signal is received, such as the tone F1, it will pass through the tuned circuit 26 to the detector 28. The resulting plate current from the detector 28 will effect the energization of the guard relay 37 which will consequently operate its armature to connect the grid of the other detector 29 to the grounded junction point 41. This serves to disable the detector 29 so that, if noise currents should simulate the tone F2, they will not be able to effect the operation of the polarized relay 30. The detector 29 will remain disabled as long as the first tone F1 is being received. Similarly, if the other alternative tone signal F2 is received instead of the first tone F1, it will energize the detector 29, which, in turn, will cause the other guard relay 38 to operate its armature thereby disabling the first detector 28 by connecting its grid to the grounded junction point 41.

It is to be understood that the guard circuits shown in the system of Fig. 2 are not restricted in their use to only a wire line carrier system but may be used with equal facility and effectiveness in a radio receiving system. It is also to be understood that the invention is not limited to a system employing only two tone signals but may be used in systems employing any desired number of tone signals.

As was explained above, the guard circuits of Fig. 2 are effective in preventing the simulation of a tone signal by noise currents. However, they are not able to prevent the phasing out of a tone signal by noise currents of the same frequency but of opposite phase. Accordingly, in order to provide more complete protection against false operations that might be caused by interfering noise currents, the system shown in Fig. 3 is provided with additional guard circuits that are actuated directly by the noise currents instead of being actuated by the tone signals as is the case with the guard circuits of Fig. 2.

Figure 3:
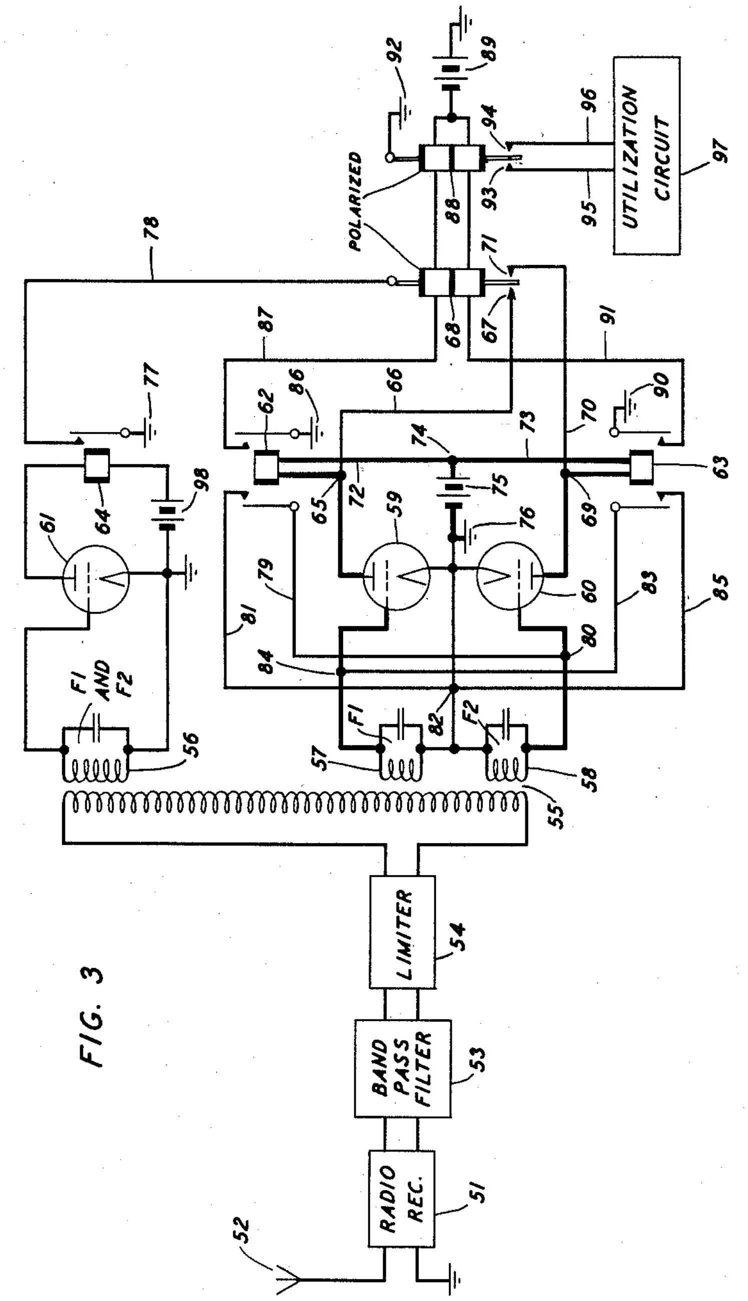
Fig. 3 illustrates a radio receiving system which is provided with a noise-actuated guard circuit for minimizing false operation of the receiver.

In Fig. 3, a radio receiving system is shown to include a radio receiver 51 having an antenna 52 for receiving carrier waves modulated alternatively with either a first low frequency tone F1 or a second low frequency tone F2. It is to be understood, as was stated above, that the invention may also be used in a multi-tone system. The first portion of this radio receiving system is similar to that of the system shown in Fig. 1 in that the demodulated output from the receiver 51 is applied through a bandpass filter 53 and a limiter 54 to the primary winding of a transformer 55. It is to be understood that the invention is not limited to a radio receiving system but may be applied to a wire line system by substituting a suitable receiving line amplifier in place of the antenna 52 and the radio receiver 51 in the manner indicated in Fig. 2.

The secondary side of the transformer 55 is provided with three tuned circuits 56, 57, and 58. The tuned circuits 57 and 58 are tuned respectively to the two signal tone frequencies F1 and F2 and are coupled respectively to the control grids of electroresponsive detectors 59 and 60. The tuned circuit 56 is broadly tuned to a wider frequency band so as to admit both tone frequencies F1 and F2 and is coupled to a third electroresponsive detector 61. The plate circuit of each of the detectors 59, 60 and 61 includes the energizing winding of a respectively associated electroresponsive guard relay 62, 63, and 64. One side of the winding of the guard relay 62 is connected to a junction point 65 in the plate circuit of the detector 59. The junction point 65 is joined by a lead 66 to a contact 67 of a selector relay shown as an electroresponsive polarized relay 68. Similarly, one side of the winding of the guard relay 63 is connected to a junction point 69 in the plate circuit of the detector 60. The junction point 69 is coupled by a lead 70 to another contact 71 of the polarized relay 68. The other sides of the windings of the guard relays 62 and 63 are coupled respectively by leads 72 and 73 to a junction point 74. The junction point 74 is connected to one side of the plate supply battery 75 which has its other side connected to the cathode ground 76. The third guard relay 64 has an armature connected to a ground 77 and has its contact connected over a lead 78 to the armature of the polarized relay 68. The guard relay 64 is so designed and the gain of its associated tuned circuit 56 is so adjusted that energy from either of the tone signals F1 or F2 is not sufficient by itself to effect the energization of relay 64 which requires the presence of high level noise for effecting the operation of its armature.

The left armatures of the guard relays 62 and 63 control disabling paths similar to those described above with respect to the system shown in Fig. 2. Specifically, the left armature of the guard relay 62 is connected by a lead 79 to a junction point 80 in the path extending from the tuned circuit 58 to the grid of the detector 60, and the associated armature contact of relay 62 is connected by lead 81 to one side of a junction point 82 which has another side connected to the cathode ground 76. In a like manner, the left armature of the guard relay 63 is connected by a lead 83 to a junction point 84 in the path extending from the tuned circuit 57 to the grid of the detector 59, and the associated armature contact of relay 63 is connected by a lead 85 to another side of the grounded junction point 82.

The right armature of the guard relay 62 is connected to a ground 86 and its associated contact is connected over a lead 87 to the upper winding of the polarized relay 68 and then through the upper winding of another electroresponsive polarized relay 88 to a grounded battery 89. Similarly, the right armature of the guard relay 63 is connected to a ground 90 and its associated contact is connected by a lead 91 to the lower windings in series of the polarized relays 68 and 88 and then to the grounded battery 89. The armature of the polarized relay 88 is connected to a ground 92 and its associated contacts 93 and 94 are connected by leads 95 and 96, respectively, to a utilization circuit 97 which may be suitable switching equipment in which case the polarized relay 88 would function as a signaling instrumentality as was explained above.

In considering the operation of the system represented in Fig. 3, let it first be assumed that the tone signal F1 is received by the radio receiver 51 and that the accompanying noise energies are of negligible level. Accordingly, the tone energy F1 will pass through the tuned circuit 57 to the detector 59 and the resulting flow of plate current from the battery 75 will effect the energization of the guard relay 62 which will consequently operate both its armatures. The operation of the left armature of relay 62 closes the guard circuit 79—81 thereby disabling the detector 60 for the purpose explained above in connection with the description of the system shown in Fig. 2. The operation of the right armature of relay 62 completes a path for current to flow from the battery 89, through the upper windings of the polarized relays 88 and 68, and then along the lead 87 to ground 86. This causes the armature of relay 88 to apply ground 92 over its left contact 93 and then along the lead 95 to the utilization circuit 97. At the same time, the armature of the other polarized relay 68 will move into engagement with its left contact 67. However, since the noise level was assumed to be negligible at this time, the guard relay 64 will not be energized and the ground 77 will remain disconnected from the lead 78 as is indicated in Fig. 3.

When the signal transmission is switched from the first tone F1 to the second tone F2, the signal tone energy will pass through the tuned circuit 58 to energize the detector 60. This closes the path for current from battery 75 to flow over the lead 73, through the winding of the guard relay 63 to the junction point 69, and then through the thermionic detector 60. Since the detector 59 will have ceased to be conductive at this time, relay 62 will have released its armatures. However, relay 63 will now operate its armatures with its left armature closing the guard circuit 83—85 for disabling the detector 59 so that it will not be operated by a simulated signal caused by noise currents. The operation of the right armature of relay 63 applies the ground 90 to the energizing circuit extending from the battery 89 through the lower windings of both of the polarized relays 68 and 88. This causes the polarized relay 88 to move its armature to its right contact 94 thereby switching the ground 92 to the lead 96 extending to the utilization circuit 97. The polarized relay 68 also moves its armature to its right contact 71, but, since it was assumed that noise is negligible at this time, the path leading from its armature along the lead 78 will be open at the armature contact of relay 64.

Let it now be assumed that, while the first signal tone F1 is being received, noise currents appear having high level energies with frequencies corresponding to either or both of the signal tone frequencies F1 and F2. These noise currents will pass through the filter 56 to the detector 61 and the resulting flow of plate current from the battery 98 through the winding of the guard relay 64 will be sufficient to cause relay 64 to operate its armature. This serves to connect the ground 77 over the lead 78 to the armature of the polarized relay 68. Since it was assumed that the first signal tone F1 is being received, then the armature of the polarized relay 68 will be in engagement with its left contact 67 as was explained above. Accordingly, a holding circuit for maintaining the guard relay 62 in an energized condition now extends from the battery 75 to the junction point 74, along the lead 72, through the winding of relay 62 to the junction point 65, along the lead 66, over the left contact 67 and armature of relay 68, along the lead 78, and then over the contact and armature of relay 64 to the ground 77.

The manner in which the system of Fig. 3 is protected against any false operation of the utilization circuit 97 that might otherwise tend to be produced by noise currents will now be explained by first assuming that some of the noise currents are of the same frequency as the signal tone F1 but are of opposite phase. These noise currents will enter the tuned circuit 57 and, if their magnitude is sufficiently large, they will phase out the signal tone energy with the result that the thermionic detector 59 will produce no output energy. This would tend to effect the release of the armatures of the guard relay 62 if it were not for the fact that the holding circuit 66—78 is now closed as was described above. Thus, even though there would be no output from the detector 59, current from battery 75 will flow through the winding of relay 62 and over the holding circuit 66—78 to ground 77 thereby holding the armatures of relay 62 in their operated condition. Accordingly, the path extending from battery 89 through the upper windings of the polarized relays 68 and 88 and over the lead 89 to ground 86 will be held closed. This, in turn, serves to hold the armature of relay 88 in engagement with its left contact 95 thereby maintaining the utilization circuit 97 in the condition in which it was originally placed by the signal tone F1.

During this time, if some of the noise currents are of the same frequency as the other signal tone F2, they will enter the tuned circuit 58 but they will not be able to produce any effect upon the detector 60. This is due to the fact that the detector 60 is now disabled by the guard circuit 79—81 which is kept in a closed condition by virtue of the left armature of relay 62 being held in its operated condition as was described above.

Similarly, if noise currents having frequencies corresponding to either or both of the signal tone frequencies F1 and F2 arrive while the second signal tone F2 is being received, they will be unable to produce false operation of the detector 59 because the guard circuit 83—85 will be closed at this time as was explained above. Since the guard relay 63 will now be held in its energized condition by the closure of the holding circuit extending from ground 77 along lead 78, over the armature and contact 71 of the polarized relay 68, and then along the lead 70 to the winding of relay 63, any noise currents which enter the tuned circuit 58 will be unable to effect false operation of the armature of the polarized relay 88 which will now be held in engagement with its right contact 94.

Thus, by means of the several guard relay circuits described above, the receiving circuit shown in Fig. 3 is fully protected against any false operation of the polarized relay 88 and the utilization circuit 97 that might tend to be caused by noise currents. In other words, when noise currents occur during the time that one of the signal tones is being received, the guard circuits will function to maintain the utilization circuit 97 in the condition in which it was originally placed by the particular signal tone being received. The guard circuits serve to hold the polarized relay 88 and the utilization circuit 97 in this condition until the level of the received noise is considerably reduced and the transmission of the original signal tone is terminated.

What is claimed is:

1. In a tone signaling system, a signal receiver comprising in combination an input circuit, a first signal circuit, a second signal circuit, an auxiliary circuit, said first and second signal circuits and said auxiliary circuit all being coupled to said input circuit, a first electroresponsive device having first and second energizing circuits, means in said first signal circuit for controlling said first energizing circuit, first means controlled by said first device for disabling said second signal circuit, second means controlled by said first device for controlling a first portion of said second energizing circuit, and a second electroresponsive device coupled to said auxiliary circuit for controlling a second portion of said second energizing circuit.

2. In a communication system employing tone signals of different frequencies, a signal receiver comprising in combination a first circuit tuned to a first signal tone frequency, a second circuit tuned to a second signal tone frequency, control means including first means energized in response to the passage of said first tone signal through said first tuned circuit for disabling said second tuned circuit, second means energized in response to the passage of said second tone signal through said second tuned circuit for disabling said first tuned circuit, a third circuit tuned to both said first and second signal tone frequencies, a holding circuit coupled to said third circuit, a source of potential coupled to said holding circuit, and an electroresponsive device responsive to the passage of electrical energy through said third circuit for coupling said potential source over said holding circuit to that one of said first and second means which is energized at that particular time.

3. In a communication system employing tone signals of different frequencies, a signal receiver comprising in combination a first circuit tuned to a first signal tone frequency, a first electroresponsive device coupled to said first tuned circuit, first means responsive to the passage of said first tone signal through said first tuned circuit for energizing said first device, a second circuit tuned to a second signal tone frequency, a second electroresponsive device coupled to said second tuned circuit, second means responsive to the passage of said second tone signal through said second tuned circuit for energizing said second device, a third circuit tuned to both said first and second signal tone frequencies, a third electroresponsive device coupled to said third tuned circuit, a utilization circuit having two alternative conditions of operation, third means actuated in response to the energization of one of said first and second devices for placing said utilization circuit in one of its conditions of operation, fourth means actuated in response to the energization of the other of said first and second devices for placing said utilization circuit in its other condition of operation, control means for preventing simultaneous actuation of said third and fourth means, said control means being responsive to the energization of either one of said first and second devices for disabling the signal-responsive means to which the other of said first and second devices is coupled, a holding circuit coupled to said third electroresponsive device, and a source of potential coupled to said holding circuit, said third electroresponsive device being responsive to the passage of electrical energy through said third circuit for applying said potential over said holding circuit to that one of said first and second electroresponsive devices which is energized at that particular time.

4. A tone signaling system comprising in combination a first circuit tuned to a first band of frequencies, a second circuit tuned to a second band of frequencies, a first electroresponsive device coupled to said first circuit and operated in response to the presence in said first circuit of electrical energy having frequencies in said first band for disabling said second circuit, a second electroresponsive device coupled to said second circuit and operated in response to the presence in said second circuit of electrical energy having frequencies in said second band for disabling said first circuit, a signaling instrumentality having two alternative conditions of operation, means actuated by the operation of said first device for placing said instrumentality in one of its conditions of operation, means actuated by the operation of said second device for placing said instrumentality in its other condition of operation, and control means for effecting the holding of said signaling instrumentality in that one of its conditions of operation to which it has been placed, said control means including a locking circuit for holding said first and second electro-responsive devices operated, a third circuit tuned to a third band of frequencies, and a third electroresponsive device coupled to said third circuit and operated in response to the presence in said third circuit of electrical energy having frequencies in said third band for closing said locking circuit.

5. A tone signaling system in accordance with claim 4 wherein said control means includes a first coupling circuit for coupling said first electroresponsive device to said locking circuit, a second coupling circuit for coupling said second electroresponsive device to said locking circuit, and a fourth electroresponsive device for selectively connecting said locking circuit to said first coupling circuit and alternatively to said second coupling circuit.

6. A tone signaling system in accordance with claim 4 wherein said control means includes a first coupling circuit for coupling said first electroresponsive device to said locking circuit, a second coupling circuit for coupling said second electroresponsive device to said locking circuit, a fourth electroresponsive device having two alternative conditions of operation, a first energizing circuit controlled by said first electroresponsive device for placing said fourth electroresponsive device in its first condition of operation for connecting said locking circuit to said first coupling circuit, and a second energizing circuit controlled by said second electroresponsive device for placing said fourth electroresponsive device in its second condition of operation for connecting said locking circuit to said first coupling circuit.

References Cited in the file of this patent

UNITED STATES PATENTS

| | | |
|---|---|---|
| 2,457,730 | Roberts | Dec. 28, 1948 |
| 2,803,746 | Dimmer | Aug. 20, 1957 |